(12) United States Patent
Houston (10) Patent No.: US 6,691,816 B2
(45) Date of Patent: Feb. 17, 2004

(54) SELECTOR SYSTEM FOR VEHICLE (75) Inventor: Steven W. Houston, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/193,662

(22) Filed: Jul. 11, 2002

(65) Prior Publication Data

US 2004/0007410 A1 Jan. 15, 2004

(51) Int. Cl.[7] .............................................. B60K 17/00
(52) U.S. Cl. ..................... 180/336; 180/315; 74/473.12
(58) Field of Search ............................... 180/336, 315, 180/19.3; 74/473.12

(56) References Cited

U.S. PATENT DOCUMENTS

| 2,609,900 | A | | 9/1952 | Neracher et al. | |
|---|---|---|---|---|---|
| 2,826,283 | A | | 3/1958 | Morse | |
| 2,874,585 | A | | 2/1959 | Lasley | |
| 2,994,233 | A | | 8/1961 | Gerard | |
| 3,184,989 | A | | 5/1965 | Rhodes | |
| 3,276,285 | A | | 10/1966 | Irgens | |
| 4,297,909 | A | * | 11/1981 | Crouse | 74/473.11 |
| 4,427,084 | A | * | 1/1984 | Savard, Jr. | 180/19.3 |
| 4,552,031 | A | * | 11/1985 | Barbagli | 74/473.21 |
| 4,614,130 | A | | 9/1986 | Heismann et al. | |
| 4,723,933 | A | | 2/1988 | Marto | |
| 4,879,922 | A | | 11/1989 | Suzuki | |
| 5,187,998 | A | | 2/1993 | Asano et al. | |
| 5,400,673 | A | | 3/1995 | Brock | |
| 5,845,536 | A | | 12/1998 | Certeza | |
| 5,878,623 | A | | 3/1999 | Teich | |
| 5,959,421 | A | * | 9/1999 | Cherry et al. | 318/432 |
| 6,561,303 | B2 | * | 5/2003 | Pierce et al. | 180/336 |

* cited by examiner

Primary Examiner—Michael J. Carone
Assistant Examiner—M. Thomson
(74) Attorney, Agent, or Firm—Harness Dickey & Pierce, P.L.C.

(57) ABSTRACT

A shift selector system is provided for selecting an operating mode of a vehicle axle. The system includes an operator shift mechanism including a rotatably supported cam rotatable between a forward position, a neutral position and a reverse position, and a spring operably interconnected to the cam for selectively biasing the cam toward one of the forward and reverse positions. An axle shift mechanism is operably interconnected to the vehicle axle and in remote communication with the operator shift mechanism. The axle shift mechanism includes a shift lever respectively rotatable with rotation of the cam for establishing the operating mode of the vehicle axle. The axle shift mechanism includes a compression spring assembly for enabling delayed rotation of the shift lever. A neutral lock mechanism is operably supported by the cam for selectively prohibiting rotation of the cam from the neutral position.

28 Claims, 7 Drawing Sheets

SELECTOR SYSTEM FOR VEHICLE

FIELD OF THE INVENTION

The present invention relates to vehicle drive selector systems and more particularly to a golf car, forward-neutral-reverse drive selector system.

BACKGROUND OF THE INVENTION

In a simplistic form, there are three basic operating modes of a vehicle: forward, neutral and reverse. Traditionally, vehicles include a power plant, such as an internal combustion engine or an electric motor, or both, a transmission and a drive axle. The power plant supplies drive torque to the drive axle through the transmission, which provides gear reduction. A forward-neutral-reverse drive selector system (FNR system) is implemented to enable operator selection of the operating mode of the vehicle. For golf car applications, the FNR system is usually integrated into the drive, axle, which is then referred to as a transaxle.

FNR systems associated with golf car transaxles may use a pin, or dog-drive, system or a conventional automotive type synchronizer system to alternatively engage the drive axle for establishing forward or reverse. With particular regard to dog-drive systems, such FNR systems can only be engaged in discreet rotational positions, whereby the pins are aligned with receiving holes. If the pins are not properly aligned with the receiving holes, the drive axle must rotate further before forward or reverse modes may be properly established. These FNR systems are actuated through a rotary shaft protruding through a housing of the drive axle and include a minimal spring-loaded detent in the forward and reverse positions and optionally in the neutral position.

External to the drive axle, a cable operated FNR shift mechanism is provided for remote operation of the internal FNR system components. The FNR shift mechanism includes a rotary shift lever operating opposed, pull-type cables connected to the drive axle through a lever. Because the drive axle is unable to engage forward or reverse in any given rotational position, traditional FNR shift mechanisms also include a provision to enable the operator manipulated shift lever to shift fully into the forward or reverse position, while maintaining torque on the internal FNR system components.

This provision gives the operator tactile feedback that the shift is complete, although the actual shift may not complete until the pins align with the receiving holes. The provision includes a pair of compression springs which connect the cables of the FNR shift mechanism to the lever associated with the drive axle. When a cable is pulled, to select one of either forward or reverse, the cable compresses a spring until the spring force is sufficient to enable the drive axle to shift. If the shift pins are aligned with the receiving holes the shift occurs with minimal force. However, if the shift pins are out of alignment, the spring remains compressed and maintains torque on the drive axle shift mechanism until the pins become aligned. The operator manipulated shift lever goes over-center, using the force from the springs to maintain the shift. The compression springs remain under some load, transmitted through the cables, at all times that they are engaged.

Traditional FNR systems, like that described immediately above, retain specific disadvantages. Initially, because the shift cables are performing work to compress the springs, as opposed to shifting the drive axle, shifting effort is higher than desired. Also, wear on the cables is a concern because the cables are under load at all times. Further, because adjustment of the cable length determines the spring load during a shift event, the cable characteristics significantly influence feel and reliability. Finally, the over-centering of the FNR system occurring at the operator manipulated shift lever and the over-travel occurring at the drive axle shift lever makes it difficult to reliably locate the neutral position in the axle from the operator's location. For the same reasons, it is impractical to provide a neutral lock mechanism (for servicing and towing the vehicle) at an easily accessible location.

Therefore, it is desirable in the industry to provide an improved FNR system which overcomes the disadvantages associated with traditional FNR systems, as described in detail above.

SUMMARY OF THE INVENTION

Accordingly, the present invention provides a shift selector system for selecting an operating mode of a vehicle axle. The shift selector system includes an operator shift mechanism and an axle shift mechanism. The operator shift mechanism has a rotatably supported cam rotatable between a forward position, a neutral position and a reverse position and a spring operably interconnected to the cam for selectively biasing the cam toward one of the forward position and the reverse position such that an axis of the spring selectively intersects a rotational axis of the cam when the cam is in the neutral position, whereby the spring is ineffective for rotationally biasing the cam and is effective for rotationally biasing the cam when the cam is in one of the forward or neutral positions. The axle shift mechanism is operably interconnected to the vehicle axle and is in remote communication with the operator shift mechanism. The axle shift mechanism includes a shift lever respectively rotatable with rotation of the cam for establishing the operating mode of the vehicle axle.

The present invention also provides a compression spring assembly associated with the axle shift mechanism for enabling delayed rotation of the shift lever to a respective position induced by rotation of the cam. In this manner, mode shifting can occur once the internal components of the drive axle are properly aligned and stress in the push/pull cable can be relieved.

The present invention further provides a neutral lock mechanism operably supported by the cam for selectively prohibiting rotation of the cam from the neutral position. In this manner, the neutral lock mechanism is easily accessible by an operator and enables locking of the drive axle in the neutral mode for maintenance or towing purposes.

Additionally, the present invention provides a notification system operably interconnected with the operator shift mechanism for providing a notification when the cam is in the reverse position. The notification system includes a switch in operable communication with the cam, whereby the switch is actuated as a function of a rotational position of the cam, and a notification buzzer in electrical communication with the switch for providing the notification upon actuation of the switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
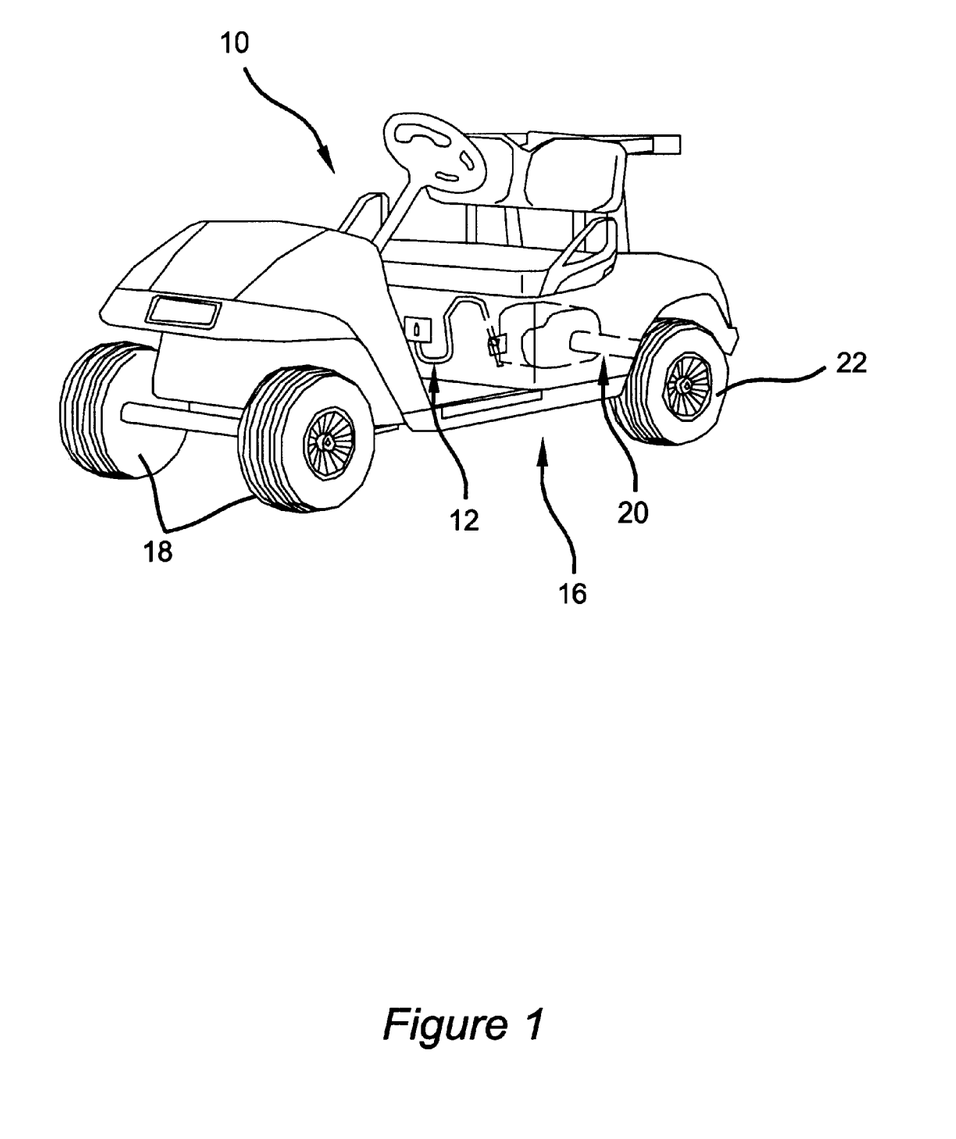
FIG. 1 is a perspective view of a golf car implementing a forward-neutral-reverse (FNR) drive selector system in accordance with the principles of the present invention.

With particular reference to FIG. 1, a vehicle 10 is shown implementing a forward-reverse-neutral drive selector system (hereinafter "the FNR system") 12 in accordance with the principles of the present invention. The vehicle 10 is specifically shown to be a golf car, however, it will be appreciated that the FNR system 12 may be implemented with a variety of vehicle types. The vehicle 10 includes a body 14 supported on a drive line 16 having a pair of front wheels 18, a drive axle 20 and a pair of rear wheels 22 drivably coupled to the drive axle 20. The drive axle 20, is powered by a power plant, such as an internal combustion engine, electric motor and the like (not shown), through a transmission (not shown). The FNR system 12 is operably attached to the drive axle 20 for enabling selection of one of three operating modes of the vehicle 10: forward, neutral or reverse.

Figure 2:
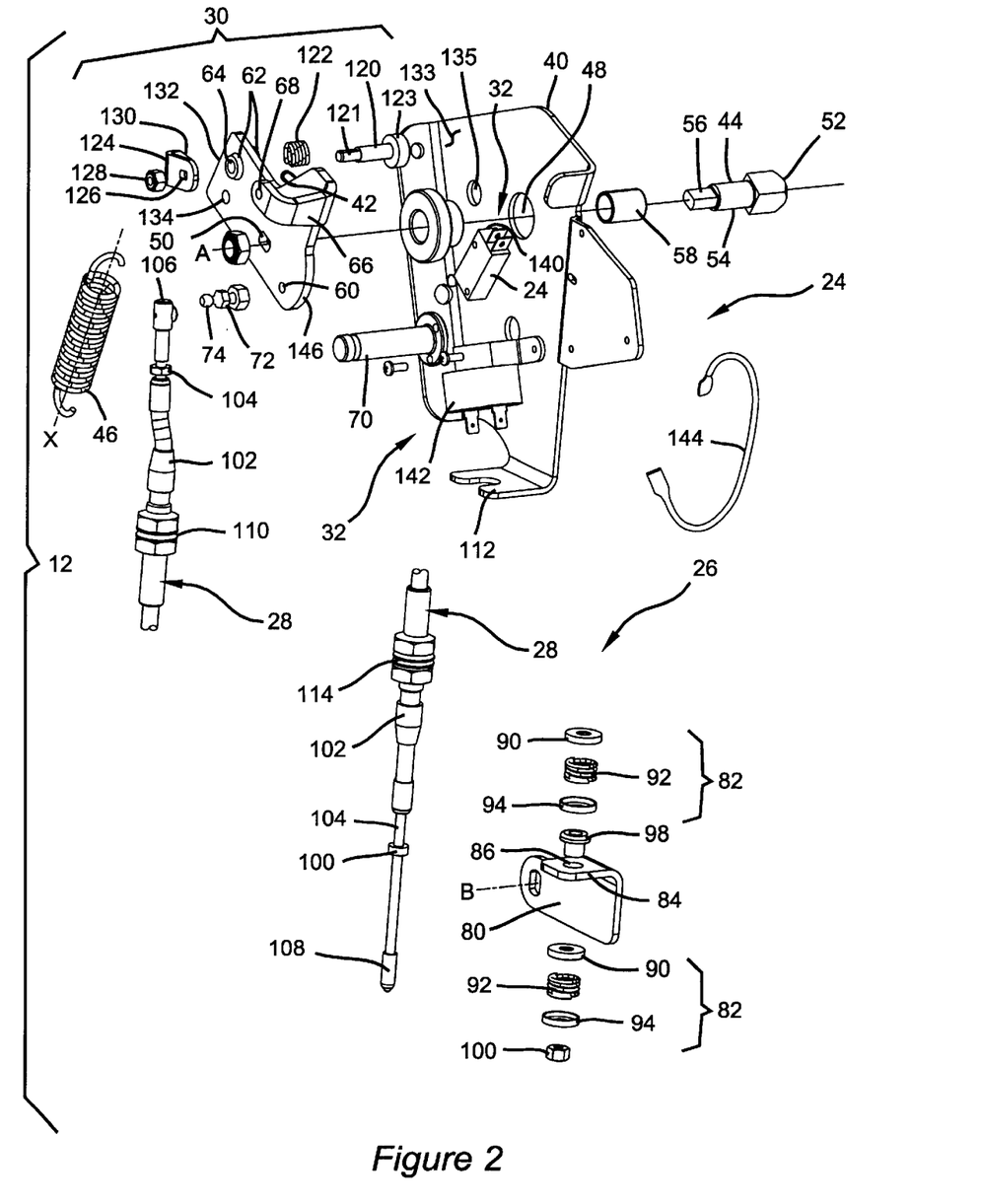
FIG. 2 is an exploded View of the FNR drive selector system.

With reference to FIG. 2, the FNR system 12 includes an operator shift mechanism 24 operably interconnected to an axle shift mechanism 26 through a push/pull cable 28. The FNR system 12 further includes a neutral lock mechanism 30 operably supported by the operator shift mechanism 24. A notification system 32 is further provided and is in operable communication with the operator shift mechanism 24 for notifying an operator of a particular operating mode, as described in further detail hereinbelow.

The operator shift mechanism 24 includes a bracket 40, a cam 42, a selector shaft 44 and an extension spring 46. The cam 42 is rotatably supported by the bracket 40 about an axis A, whereby the selector shaft 44 is received through an aperture 48 of the bracket 40 and into a keyed aperture 50 of the cam 42. More specifically, the selector shaft 44 includes a head 52, a cylindrical section 54 and a keyed section 56. The head 52 is operably attached to an external operator lever (not shown) for turning the selector shaft 44. A bushing 58 is received over the cylindrical section 54 and both are received through the aperture 48. The keyed section 56 mates with the keyed aperture 50 of the cam 42, thereby fixing the cam 42 for rotation with the selector shaft 44.

The cam 42 includes the keyed aperture 50, a stud aperture 60, a hub 62 having an aperture 64 therethrough and a curved arm 66 having a spring aperture 68 disposed at an end thereof. The extension spring 46 is anchored between a spring post 70 extending from the bracket 40 and the spring aperture 68 of the curved arm 66 of the cam 42 and defines a linear axis X. The neutral lock mechanism 30 is operably supported through the aperture 64 of the hub 62, as described in further detail herein. A ball stud 72 is partially received into the stud aperture 60 and extends from the cam 42, including a ball end 74 for operable engagement with the push/pull cable 28.

The axle shift mechanism 26 includes a shift lever 80 fixed for rotation with a drive selector (not shown) of the drive axle 20, and opposing spring assemblies 82 operably interconnecting the shift lever 80 and push/pull cable 28. As described in further detail below, the push/pull cable 28 induces rotation of the shift lever 80 about an axis B, thereby actuating the drive selector to establish one of the operating modes described above. The shift lever 80 includes a perpendicularly extending tab 84 having a cable aperture 86 therethrough and which is sandwiched between the spring assemblies 82 as a compression assembly 88. The spring assemblies 82 each include a first cup washer 90, a compression spring 92 and a second cup washer 94. An end of the push/pull cable 28 is received through one of the spring assemblies 82, through a bushing 98 received into the cable aperture 86 and finally through the other spring assembly 82. The compression assembly 88 is held together between a lock nut 100 and a steel fitting 101 swaged onto the push/pull cable 28.

Figure 3:
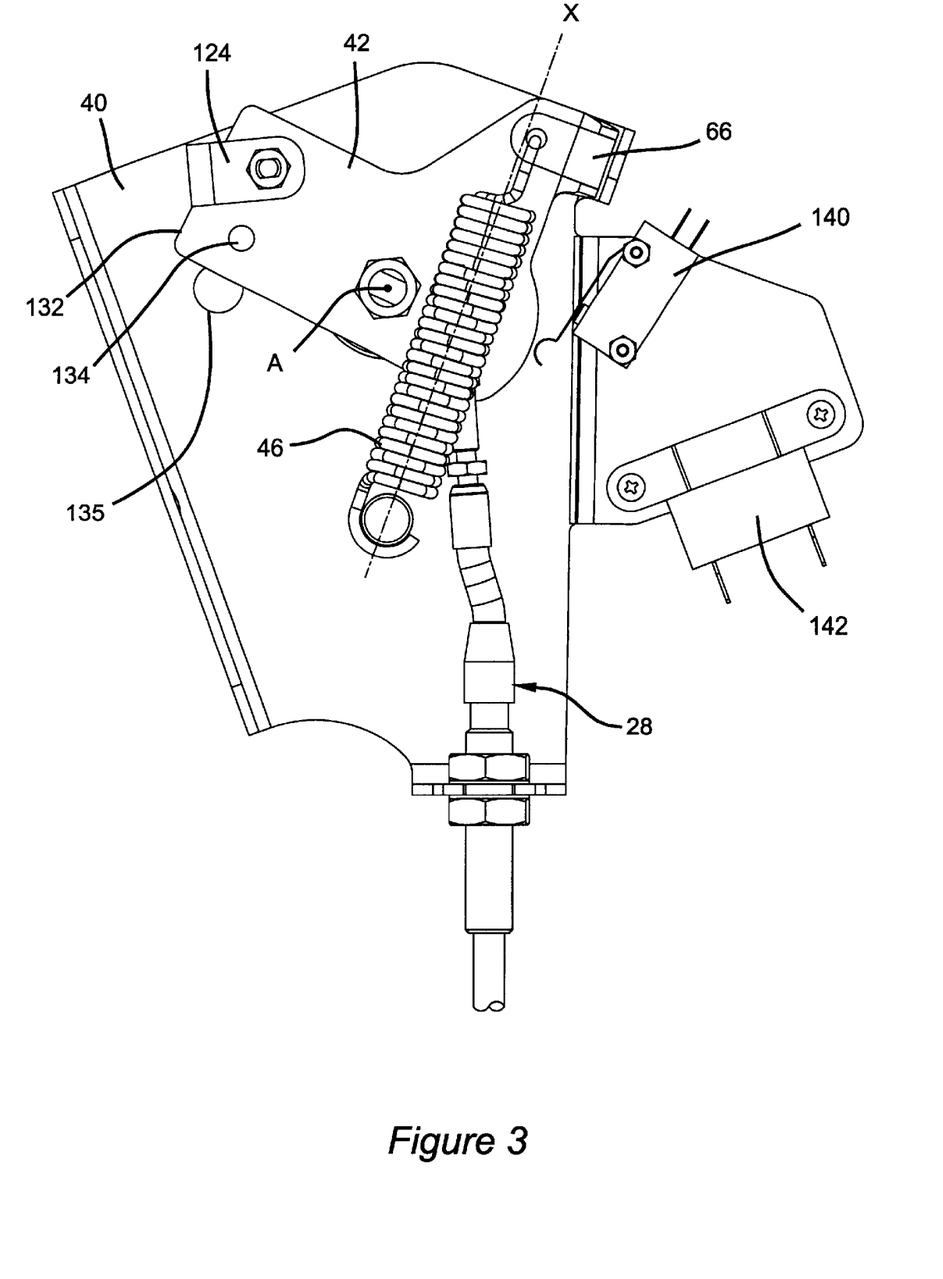
FIG. 3 is a plan view of an operator FNR shift mechanism of the FNR drive selector system positioned in a reverse position.
Figure 4:
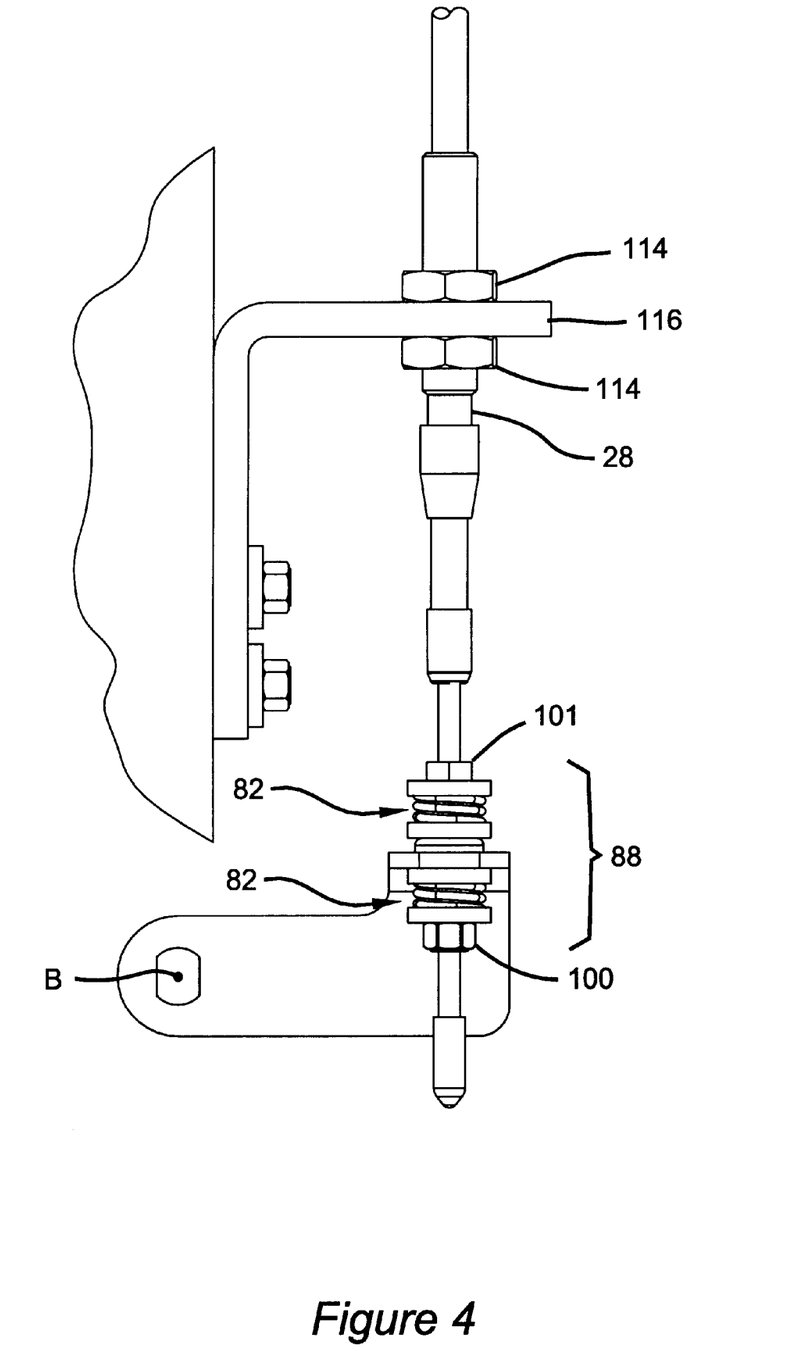
FIG. 4 is a plan view of an axle FNR shift mechanism of the FNR drive selector system moving towards a forward position.
Figure 5:
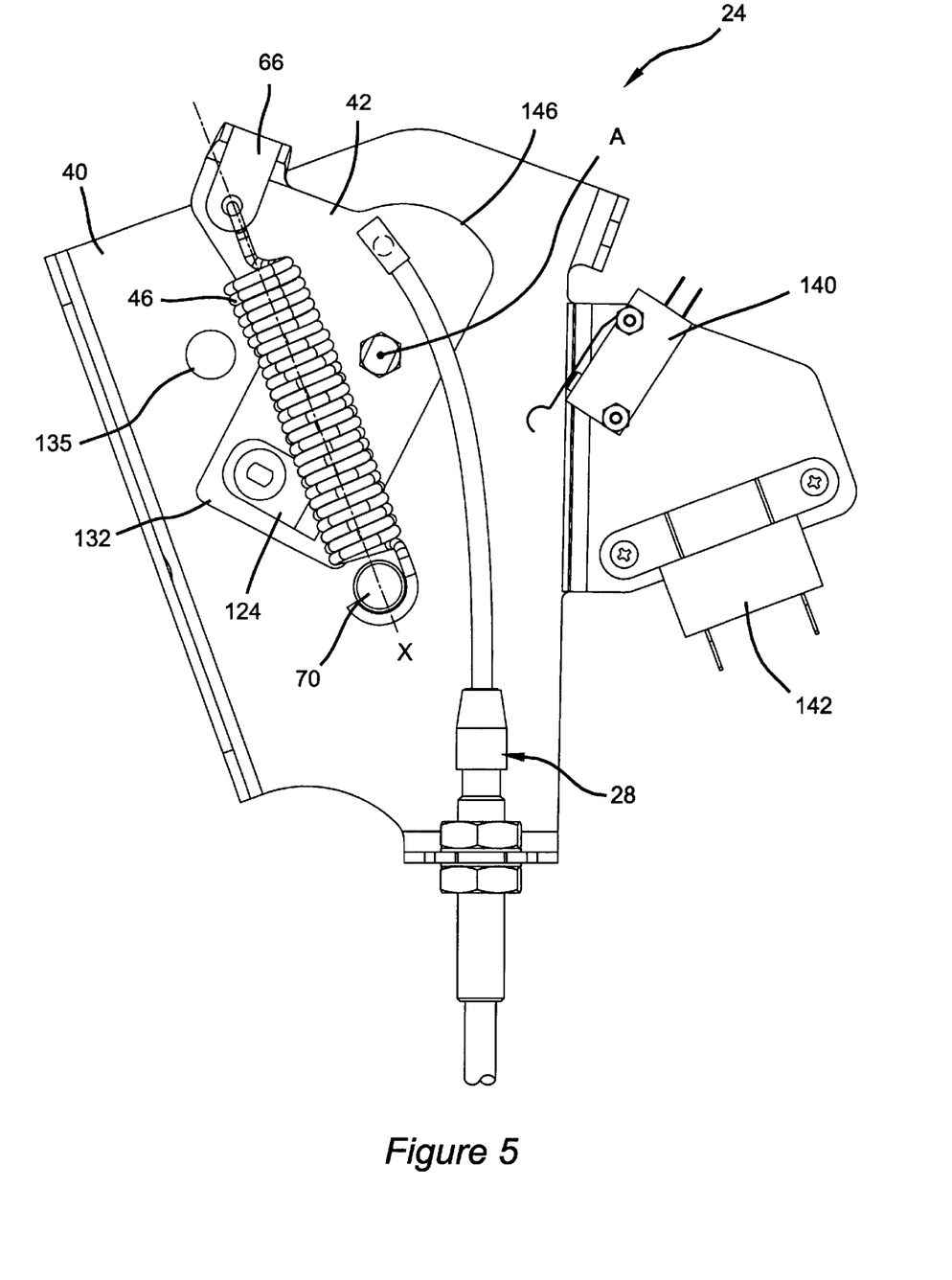
FIG. 5 is a plan view of the operator FNR shift mechanism positioned in a forward position.
Figure 6:
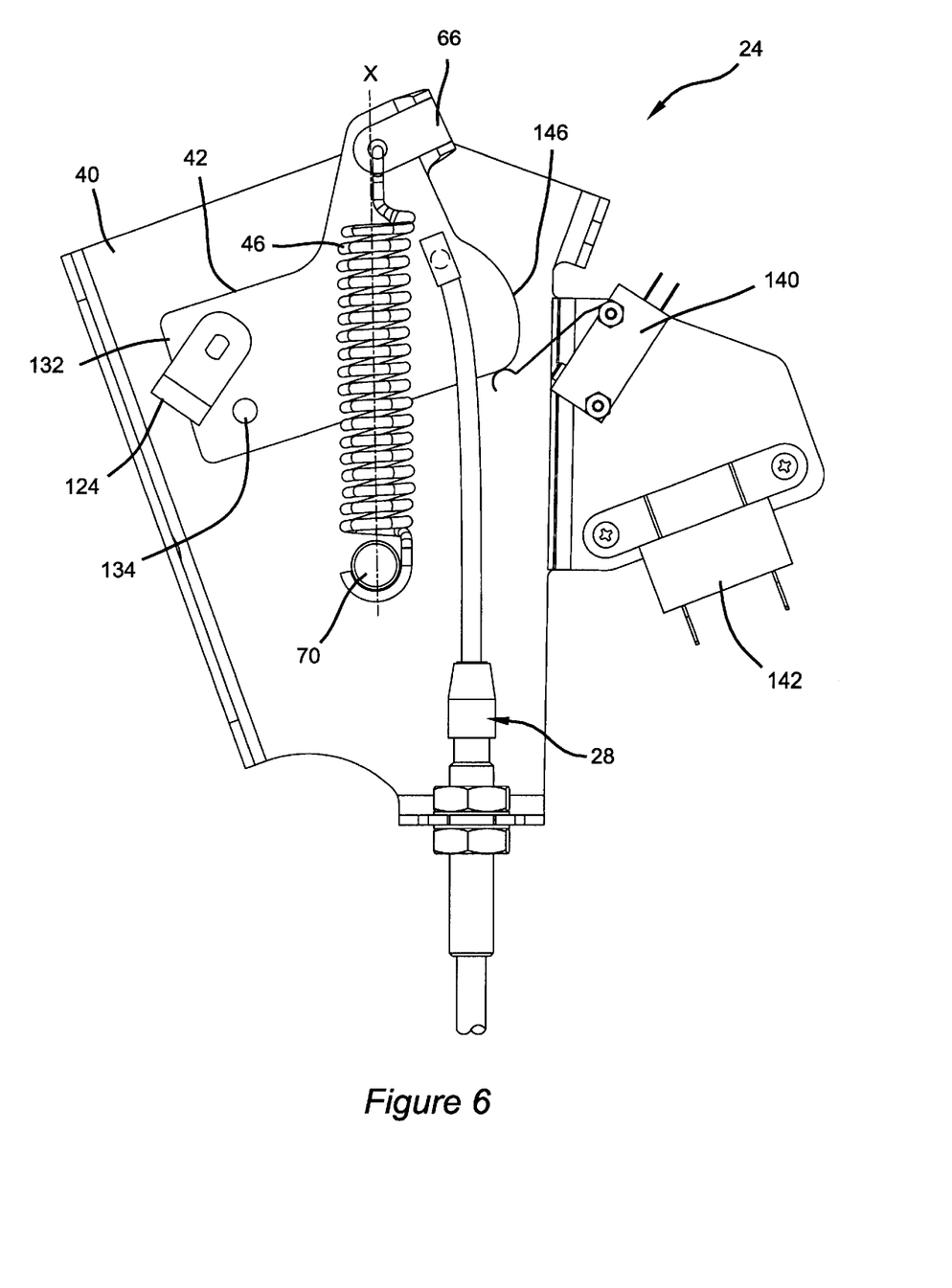
FIG. 6 is a plan view of the operator FNR shift mechanism positioned in a neutral position.
Figure 7:
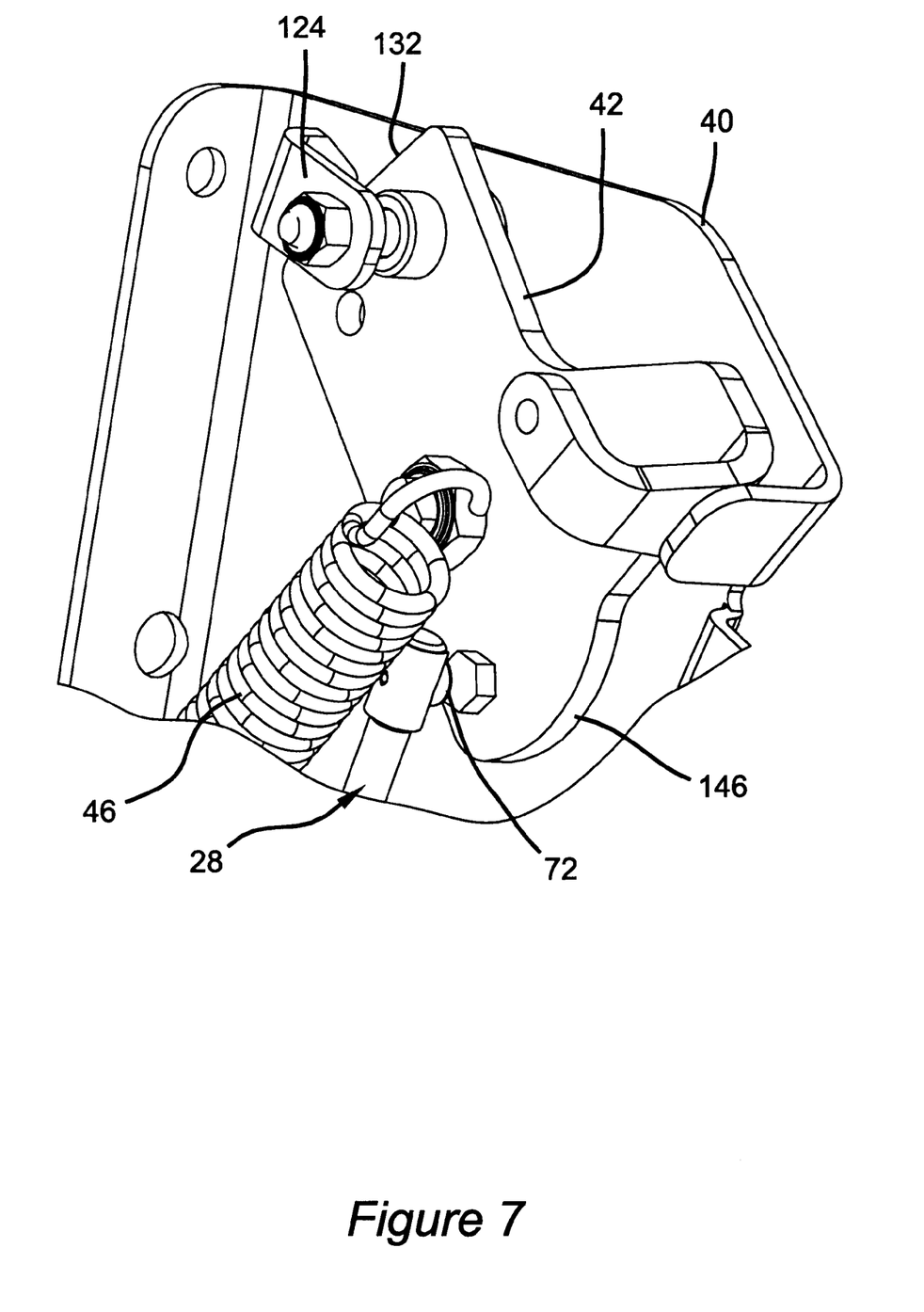
FIG. 7 is a perspective view of a portion of the operator FNR shift mechanism.

The push/pull cable 28 includes a cable housing 102 within which a cable 104 is slidably disposed. The cable 104 includes a first end 106 adapted for interconnection with the ball stud 72 of the cam 42 and a second end 108 adapted to be received through the compression assembly 88. A first pair of securing nuts 110 is threadably disposed about the cable housing 102 for securing the push/pull cable 28 to an anchor tab 112 of the bracket 40, as best seen in FIG. 3. More specifically, the anchor tab 112 is sandwiched between the tightened securing nuts 110. Similarly, a second pair of securing nuts 114 is threadably disposed about the cable housing 102 for securing the push/pull cable 28 to an anchor bracket 116 of the drive axle 20, as best seen in FIG. 4. More specifically, the anchor bracket 116 is sandwiched between the tightened securing nuts 114.

The neutral lock mechanism 30 is operably supported by the cam 42 and includes a lock pin 120, a compression spring 122 and a lock bracket 124. The compression spring 122 is disposed about the lock pin 120, which is received through the aperture 64 of the hub 62, whereby the compression spring 122 is positioned between a head 123 of the lock pin 120 and the hub 62. The lock pin 120 includes flats 121, which are received through a keyed aperture 126 of the lock bracket 124, thereby being fixed for rotation with and rotatably supporting the lock bracket 124. A nut 128 is threaded to an end of the lock pin 120 for holding the components assembled.

The lock bracket 124 is biased toward the hub 62 by the compression spring 122 acting against the head 123 of the lock pin 120. In one rotational position, the lock bracket 124 is biased toward the hub 62 with a pointed end 130 hanging over an edge 132 of the cam 42. In this manner, the head 123 of the lock pin 120 is biased against a surface 133 of the bracket 40, or, if properly aligned, into a lock aperture 135 of the bracket 40. If biased into the lock aperture 135, the lock pin 120 holds the cam 42 in the neutral position. In an alternative rotational position, the lock bracket 124 is biased toward the hub 62 with the pointed end 130 biased into a hole 134 formed through the cam 42, thereby retracting the lock pin 120 from engagement with the lock aperture 135 of the bracket 40.

The notification system 32 includes a limit switch 140, a buzzer 142 and a wire 144 for interconnecting the limit switch 140 and the buzzer 142. In the preferred embodiment, the buzzer 142 is provided as a continuous tone buzzer, however, it is anticipated that the buzzer 142 may be of any kind known in the art. The limit switch 140 is in operable contact with a cam edge 146 of the cam 42. As the cam 42 is caused to rotate, the cam edge 146 acts upon the limit switch 140 to actuate the limit switch 140. Actuation of the limit switch 140 induces an electronic signal to be sent through the wire 144 for activating the buzzer 142.

With reference to FIGS. 2 through 7, operation of the FNR system 12 will be described in detail. In short, the operator shift mechanism 24 functions to manipulate the axle shift mechanism 26 for positioning the shift lever 80 in a forward position, a neutral position or a reverse position. More particularly, the operator shift lever (not shown) is actuable to one of three positions, forward, neutral and reverse, for correspondingly rotating the selector shaft 44 about the axis A, thereby rotating the cam 42. In the neutral position the linear axis X of the spring 46 intersects and is generally perpendicular to the rotational axis A of the cam 42 (see FIG. 6). The neutral alignment of the axis A and X prevents the spring 46 from biasing the cam 42 in any rotational direction. In this manner, the cam 42 rests in the neutral position and shift lever 80 correspondingly rest in its neutral position.

Upon rotation of the selector shaft 44 towards either the forward position (see FIG. 5) or the reverse position (see FIG. 3) the linear axis X is offset from intersection with the axis A, thereby enabling the spring 46 to rotationally bias the cam 42 about the axis A into the desired position. As the cam 42 rotates toward the forward position, a pulling force is induced through the push/pull cable 28 for correspondingly rotating the shift lever 80 into its forward position. Likewise, as the cam 42 rotates toward the reverse position, a pushing force is induced through the push/pull cable 28 for correspondingly rotating the shift lever 80 into its reverse position. Additionally, as the cam 42 rotates toward the reverse position, the cam edge 146 of the cam 42 slidably engages the limit switch 140, thereby depressing the limit switch 140 to activate the buzzer 142. In this manner, a warning signal is provided, notifying the operator and others in the surrounding area that the vehicle 10 is in reverse.

With particular reference to FIG. 4, actuation of the shift lever 80 will be described in detail. With regard to the forward position, the pulling force induced through the push/pull cable 28 urges the lower compression spring 92 against the shift lever 80 to further induce counter-clockwise rotation (per the view of FIG. 5) thereof. However, if the internal components of the drive axle 20 are not properly aligned for shifting into the forward mode, the lower compression spring 92 is compressed by the push/pull cable 28 against the shift lever 80, continuously urging the shift lever 80 in the counter-clockwise direction. Upon proper alignment of the internal components of the drive axle 20, the shift lever 80 is induced to rotate to the forward position by the lower compression spring 92. Once the shift lever 80 achieves the forward position, compression of the lower compression spring 92 is relieved, thereby eliminating any biasing force against the shift lever 80 and any stress in the push/pull cable 28.

With regard to the reverse position, the pushing force induced through the push/pull cable 28 urges the upper compression spring 92 against the shift lever 80 to further induce clockwise rotation (per the view of FIG. 3) thereof. However, if the internal components of the drive axle 20 are not properly aligned for shifting into the reverse mode, the upper compression spring 92 is compressed by the push/pull cable 28 against the shift lever 80, continuously urging the shift lever 80 in the clockwise direction. Upon proper alignment of the internal components of the drive axle 20, the shift lever 80 is induced to rotate to the reverse position by the upper compression spring 92. Once the shift lever 80 achieves the reverse position, compression of the upper compression spring 92 is relieved, thereby eliminating any biasing force against the shift lever 80 and any stress in the push/pull cable 28.

In some instances, such as maintenance and towing, it is desirable for the FNR system 12 to be locked in the neutral position, thereby locking the drive axle 20 in the neutral mode. To achieve this, the neutral lock mechanism 30 is manually articulated, whereby the pointed end 130 hangs over the edge 132 to enable biasing of the lock pin 120 in the lock aperture 135 of the bracket 40. In this manner, the cam 42 is locked in the neutral position, thereby locking the drive axle 20 in the neutral mode. To disengage the neutral lock, the neutral lock mechanism 30 is manually articulated, whereby the lock bracket 124 is pulled against the bias of the compression spring 122 and rotated so the pointed end 130 is biased into the aperture 134 of the cam 42 (engagement with the aperture 134 prevents accidental rotation of the lock bracket 124). In this manner, the lock pin 120 is withdrawn from possible engagement with the lock aperture 135, thereby enabling actuation of the FNR system 12 in the forward, neutral and reverse modes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shift selector system for selecting an operating mode of a vehicle axle, comprising:
   an operator shift mechanism including a rotatably supported cam rotatable between a forward position, a neutral position and a reverse position, and a spring operably interconnected to said cam for selectively biasing said cam toward one of said forward position and said reverse position; and
   an axle shift mechanism operably interconnected to the vehicle axle and in remote communication with said operator shift mechanism, said axle shift mechanism including a shift lever respectively rotatable with rotation of said cam for establishing the operating mode of the vehicle axle.

2. The shift selector system of claim 1, wherein said axle shift mechanism further comprises a first compression spring assembly for enabling delayed rotation of said shift lever to a respective position induced by rotation of said cam to one of said forward and reverse positions.

3. The shift selector system of claim 2, wherein said axle shift mechanism further comprises a second compression spring assembly for enabling delayed rotation of said shift lever to a respective position induced by rotation of said cam to the other of said forward and reverse positions.

4. The shift selector system of claim 1, wherein said spring is operably interconnected with said cam, such that an axis of said spring intersects a rotational axis of said cam when said cam is in said neutral position, whereby said spring is ineffective for rotationally biasing said cam.

5. The shift selector system of claim 1, wherein said spring is operably interconnected with said cam, such that said spring is effective for rotationally biasing said cam when said cam is in one of said forward and reverse positions.

6. The shift selector system of claim 1, further comprising a push/pull cable remotely interconnecting said operator shift mechanism and said axle shift mechanism.

7. The shift selector system of claim 6, wherein said push/pull cable interconnects said cam and said shift lever.

8. The shift selector system of claim 1, further comprising a notification system operably interconnected with said operator shift mechanism for providing a notification when said cam is in one of said forward and reverse positions.

9. The shift selector system of claim 8, wherein said notification system comprises:
   a switch in operable communication with said cam, whereby said switch is actuated as a function of a rotational position of said cam; and
   a notification buzzer in electrical communication with said switch for providing said notification upon actuation of said switch.

10. The shift selector system of claim 1, further comprising a neutral lock mechanism operably supported by said cam for selectively prohibiting rotation of said cam from said neutral position.

11. A shift selector system for selecting an operating mode of a vehicle axle, comprising:
   an operator shift mechanism including:
      a rotatably supported cam rotatable between a forward position, a neutral position and a reverse position; and
      a spring operably interconnected to said cam for selectively biasing said cam toward one of said forward position and said reverse position such that an axis of said spring selectively intersects a rotational axis of said cam when said cam is in said neutral position, whereby said spring is ineffective for rotationally biasing said cam and is effective for rotationally biasing said cam when said cam is in one of said forward and reverse positions; and
   an axle shift mechanism operably interconnected to the vehicle axle and in remote communication with said operator shift mechanism, said axle shift mechanism including a shift lever respectively rotatable with rotation of said cam for establishing the operating mode of the vehicle axle.

12. The shift selector system of claim 11, wherein said axle shift mechanism further comprises a first compression spring assembly for enabling delayed rotation of said shift lever to a respective position induced by rotation of said cam to one of said forward and reverse positions.

13. The shift selector system of claim 12, wherein said axle shift mechanism further comprises a second compression spring assembly for enabling delayed rotation of said shift lever to a respective position induced by rotation of said cam to the other of said forward and reverse positions.

14. The shift selector system of claim 11, further comprising a push/pull cable remotely interconnecting said operator shift mechanism and said axle shift mechanism.

15. The shift selector system of claim 14, wherein said push/pull cable interconnects said cam and said shift lever.

16. The shift selector system of claim 11, further comprising a notification system operably interconnected with said operator shift mechanism for providing a notification when said cam is in one of said forward and reverse positions.

17. The shift selector system of claim 16, wherein said notification system comprises:
   a switch in operable communication with said cam, whereby said switch is actuated as a function of a rotational position of said cam; and
   a notification buzzer in electrical communication with said switch for providing said notification upon actuation of said switch.

18. The shift selector system of claim 11, further comprising a neutral lock mechanism operably supported by said cam for selectively prohibiting rotation of said cam from said neutral position.

19. A vehicle having drive axle operable in one of a plurality of operating modes, comprising:
   a shift selector system operably interconnected with the drive axle for establishing one of the plurality of operating modes thereof, said shift selector system including:
      an operator shift mechanism including a rotatably supported cam rotatable between a forward position, a neutral position and a reverse position, and a spring operably interconnected to said cam for selectively biasing said cam toward one of said forward position and said reverse position; and
      an axle shift mechanism operably interconnected to the vehicle axle and in remote communication with said operator shift mechanism, said axle shift mechanism including a shift lever respectively rotatable with rotation of said cam for establishing the operating mode of the vehicle axle.

20. The vehicle of claim 19, wherein said axle shift mechanism further comprises a first compression spring assembly for enabling delayed rotation of said shift lever to a respective position induced by rotation of said cam to one of said forward and reverse positions.

21. The vehicle of claim 20, wherein said axle shift mechanism further comprises a second compression spring assembly for enabling delayed rotation of said shift lever to a respective position induced by rotation of said cam to the other of said forward and reverse positions.

22. The vehicle of claim 19, wherein said spring is operably interconnected with said cam, such that an axis of said spring intersects a rotational axis of said cam when said cam is in said neutral position, whereby said spring is ineffective for rotationally biasing said cam.

23. The vehicle of claim 19, wherein said spring is operably interconnected with said cam, such that said spring is ineffective for rotationally biasing said cam when said cam is in one of said forward and neutral positions.

24. The vehicle of claim 19, further comprising a push/pull cable remotely interconnecting said operator shift mechanism and said axle shift mechanism.

25. The vehicle of claim 24, wherein said push/pull cable interconnects said cam and said shift lever.

26. The vehicle of claim 19, further comprising a notification system operably interconnected with said operator shift mechanism for providing a notification when said cam is in one of said forward and reverse positions.

27. The vehicle of claim 26, wherein said notification system comprises:
   a switch in operable communication with said cam, whereby said switch is actuated as a function of a rotational position of said cam; and
   a notification buzzer in communication with said switch for providing said notification upon actuation of said switch.

28. The vehicle of claim 19, further comprising a neutral lock mechanism operably supported by said cam for selectively prohibiting rotation of said cam from said neutral position.

* * * * *

UNITED STATES PATENT AND TRADEMARK OFFICE
CERTIFICATE OF CORRECTION

PATENT NO.     : 6,691,816 B2
DATED          : February 17, 2004
INVENTOR(S)    : Steven W. Houston It is certified that error appears in the above-identified patent and that said Letters Patent is hereby corrected as shown below:

<u>Column 3,</u>
Line 4, "View" should be -- view --.

<u>Column 8,</u>
Line 59, after "in" insert -- electrical --.

Signed and Sealed this

Sixth Day of July, 2004

JON W. DUDAS
*Acting Director of the United States Patent and Trademark Office*